3,265,572
PROCESS FOR PREPARING TYROCIDIN AND PRODUCT PRODUCED THEREBY

William Moses, Teaneck, N.J., assignor to S. B. Penick and Company, New York, N.Y., a corporation of Delaware
No Drawing. Filed Sept. 20, 1961, Ser. No. 139,355
7 Claims. (Cl. 167—65)

This invention relates to the separation of naturally occurring antibiotic fractions present in tyrothricin.

Tyrothricin is an alcohol-soluble antibiotic material produced by the action of spore-forming gram negative bacilli such as *Bacillus brevis*. Tyrothricin is primarily a mixture of one part gramicidin and four parts tyrodicin.

Gramicidin is currently the more important fraction. It consists of three closely related neutral polypeptides and is essentially insoluble in water but is soluble in methanol. Gramicidin melts at 228–231 degrees centigrade, exhibits an ultraviolet absorption in ethanol with maxima at 2815, 2905, 2710 and a minimum at 2475 Angstrom units, and has optical rotation in ethanol $[\alpha]_D^{25}=+5°$.

Tyrocidin is a basic polypeptide antibiotic made up of two distinct components each containing alpha-amino groups. Both components are only very slightly soluble in water and are capable of being adsorbed on cationic exchange resins. Tyrocidin, despite its relative abundance, is of lesser interest since it appears to be inactivated by serum.

Various solvent extraction systems have been devised to separate gramicidin and tyrocidin but their solubility differences are slight and separations to the degree of purity required are tedious. Other methods of separation have been devised based on the selective adsorption of tyrothricin on cationic exchange resins. Since the adsorptive capacity of the resins is limited, such ion exchange processes must, of necessity, be interrupted in order to regenerate the resins employed.

I have discovered a convenient water-based process for the resolution of tyrothricin. Tyrocidin and gramicidin resulting from my separation process may be readily purified to yield pharmaceutically acceptable materials. My invention is based on the discovery of novel colloidal tyrocidin sols capable of separation from water insoluble gramicidin.

The invention sought to be patented, in its process aspect, resides in the concept of separating tyrothricin into gramicidin and tyrocidin by heating above 70 degrees centigrade an acidic aqueous suspension containing up to about 20 percent by weight of tyrothricin to form a tyrocidin sol, separating the resultant tyrocidin sol from the insoluble gramicidin, and recovering tyrocidin from the tyrocidin sol.

The invention sought to be patented, in one composition aspect, resides in the concept of a tyrocidin sol containing up to about 16 percent by weight of tyrocidin.

The invention sought to be patented, in a second composition aspect, resides in the concept of a peptizable tyrocidin gel.

The tangible embodiments of this invention are useful for the preparation of tyrocidin and its separation from gramicidin.

The manner and process of making and using this invention is illustrated by the following general description and examples, which set forth the best mode contemplated by me of carrying out the invention so as to enable any person skilled in the art of antibiotic separation to make and use the same:

The process of the present invention involves three basic steps: (1) the heating of an acidic aqueous tyrothricin suspension, (2) the separation of the resultant tyrocidin sol from gramicidin, and (3) the recovery of tyrocidin from its sol. These steps will be discussed in detail below.

When tyrothricin or mixtures of tyrocidin and gramicidin are suspended in water at acid pH's, i.e., below pH 7.0, heating the suspension to temperatures above 70 degrees centigrade, up to and including the boiling point of the suspension, will convert the tyrocidin present to a novel sol while the gramicidin present remains insoluble. In preparing the tyrocidin sol, up to 20 percent by weight of tyrothricin or its equivalent is suspended in the water. Since tyrothricin is usually available as its hydrochloride, no adjustment of the pH would be necessary in most cases. It is emphasized that at alkaline pH's, i.e., pH's above 7.0, peptization does not occur and the separation process of this invention cannot be effected. The use of concentrations above the specified range gives rise to practical difficulties making the separation difficult since the presence of more than 20 percent by weight of tyrothricin or its equivalent leads to the formation of hard to handle, viscous sols. For practical reasons, suspensions containing about 5 percent by weight of tyrothricin are to be preferred since the use of suspensions containing less than 5 percent of tyrothricin requires the handling of larger volumes of water per unit weight of tyrothricin resolved.

The tyrothricin suspension is maintained above 70 degrees centigrade until the tyrocidin has been peptized to form a sol. The time required for peptization to take place is dependent on the temperature. At the lower temperature range, i.e., 70 degrees centigrade, several hours are necessary to insure that all the tyrocidin is peptized to the sol form. At temperatures approximating the boiling point of the suspension, one to ten minutes at temperature was found to be sufficient to achieve substantially complete peptization of the tyrocidin activity. Since the mixture has a tendency to foam under agitation, it is helpful to add antifoaming agents. Various materials which do not inactivate antibiotics, such as commercial silicone defoamers and aliphatic fatty-alcohols, are available.

After the peptization is complete, the tyrocidin sol is separated from the insoluble gramicidin in any suitable manner. While filtration is the preferred separation procedure, it is possible to effect the separation by centrifugation or by decantation, i.e., by allowing the insoluble gramicidin to settle and pouring off the supernatant liquid sol. Since the more concentrated sols are quite viscous, it is preferred to carry out the separation while the liquid material is still hot. It may also be desirable to add a filter aid to prevent clogging of the filter. Filtration and centrifugation are more readily accomplished when the sol and centrifugation is handled in its most fluid state. It is also possible to reduce the viscosity of the sol by dilution, i.e., adding hot water, preferably slightly acidified (pH 3–6). It is most convenient to maintain the tyrocidin content of the sol at approximately 5 to 10 percent by weight. At this concentration, the viscosity of the sol is such that it will permit filtration at room or elevated temperatures. After filtration, the filter cake is washed free of the tyrocidin sol with hot water. The residue obtained on centrifugation may be washed with hot water in an analogous manner and re-extracted to insure removal of the last traces of any hot water soluble tyrocidin that may be present.

The tyrocidin sol filtrate is clear and almost colorless and contains about 80 percent of the tyrocidin content originally present in the tyrothricin starting material. The tyrocidin content of the sol is equivalent to between 78 percent and 87 percent of the total non-gramicidin content of the tyrothricin starting material. The sol can be concentrated by several methods including dehydration by vacuum or spray drying and by salting out the tyrocidin with concentrated salt solutions, for example, saturated sodium chloride solutions. When the sol is concentrated to a gel having a moisture content above about 10 percent by weight of the gel, the powdered gel retains colloidal properties and can be repeptized to the sol form by the addition of water. The peptizable gel is a desirable free-flowing white powder. Drying the gel to remove the last vestiges of moisture converts it from the gel form having a characteristic X-ray diffraction pattern to the customary non-colloidal form of tyrocidin having the characteristic X-ray diffraction pattern of conventional tyrocidin.

The resultant gramicidin residue represents about 30 percent by weight of the tyrothricin solids originally present. The residue is contaminated with 2 to 10 percent of colorants and related polypeptides similar to tyrocidin and gramicidin in structure. It can be purified to yield pharmaceutical grade gramicidin by solution in alcohol and purification either by solvent extraction or by adsorption via passage through ion exchange resin beds or by crystallization.

My invention is further illustrated by the following examples:

Example 1

Twenty kilograms of tyrothricin was suspended in 200 liters of water and the suspension heated to boiling. Boiling was maintained for 20 minutes and the material filtered while hot.

The hot filtrate was spray-dried to a 10 percent moisture content. The resultant powder was washed with 5 times its weight of cool water (below 20 degrees centigrade) to leach out any soluble inorganic salts. The residue was then heated to boiling with 10 times its weight of water until a clear viscous sol resulted. The sol was vacuum dried to a 13 percent moisture content and ground to a white powder having typical tyrocidin activity. The yield, on an anhydrous basis was 12.1 kilograms and equivalent to approximately 75 percent of the tyrocidin present in the starting tyrothricin.

The insoluble residue on the filter was dissolved in 80 percent methanol and purified according to the general method of U.S. Patent 2,992,164. After recrystallization from acetone, there was obtained approximately 3.8 kilograms or 95 percent of the gramicidin present in the original tyrothricin starting material.

Example 2

A 5 percent by weight suspension in water of a prepared mixture containing 20 parts by weight of gramicidin and 80 parts by weight of tyrocidin was prepared. The suspension was heated at 90 degrees centigrade for 45 minutes, a filter aid added, and the system filtered. The filter cake was washed with hot water until the filtrate no longer contained any tyrocidin sol as determined by its failure to give any reaction with a saturated solution of sodium chloride. The combined spray-dried filtrate and wash liquors showed a 99 percent recovery of the tyrocidin present in the prepared mixture.

The filter cake from the foregoing was dried at 50 degrees centigrade and then extracted with methanol to completely separate the gramicidin from the filter aid. The gramicidin was recovered from the methanol extract by precipitation with an equal volume of one percent aqueous potassium carbonate. After filtration, washing with water, and drying at 50 percent centigrade, and crystallization from 2 percent aqueous acetone, the yield of recovered gramicidin was equal to 93 percent based on the amount of gramicidin present in the prepared mixture.

The subject matter which I regard as my invention is distinctly pointed out and claimed as follows:

1. A process for separating tyrothricin into gramicidin and tyrocidin which includes heating between 70 degrees centigrade and the boiling point of the system an acidic aqueous suspension containing up to about 20 percent by weight of tyrothricin to form a tyrocidin sol, and separating the resultant tyrocidin sol from the insoluble gramicidin.

2. A process according to claim 1 wherein tyrocidin is thereafter isolated by removal of the water from the tyrocidin sol.

3. A process for separating tyrothricin into gramicidin and tyrocidin which includes heating between 70 degrees centigrade and the boiling point of the system an acidic aqueous suspension containing between about 5 to 10 percent by weight of tyrothricin to form a tyrocidin sol, and separating the resultant tyrocidin sol from the insoluble gramicidin.

4. A process according to claim 3 wherein tyrocidin is thereafter isolated by removal of the water from the tyrocidin sol.

5. A process for preparing tyrocidin as a free-flowing powder peptizable to a sol by the addition of water thereto, which includes heating between 70° centigrade and the boiling point of the system an acidic aqueous suspension containing up to about 20 percent by weight of tyrothricin to form a tyrocidin sol, separating the resultant tyrocidin sol containing about 4 to 16 percent by weight of tyrocidin from the insoluble gramicidin, annd dehydrating the said tyrocidin sol until a free-flowing powder is obtained which has a moisture content above about 10 percent by weight.

6. An acidic aqueous tyrocidin sol substantially free from gramicidin having a pH from 3 to 6 and containing between about 5 to 10 percent by weight of tyrothricin, produced by heating between 70° centigrade and the boiling point of the system an acidic aqueous suspension containing up to about 20 percent by weight of tyrothricin to form a tyrocidin sol, and separating the resultant tyrocidin sol from the insoluble gramicidin.

7. Tyrocidin, in the form of a gel, which gel (a) is a free-flowing powder, (b) has a moisture content above about 10 percent, (c) is substantially gramicidin-free, and (d) is peptizable to a sol by the addition of water thereto.

References Cited by the Examiner

Hotchkiss: Gramicidin, Tyrocidin, and Tyrothricin, Advances in Enzymology, 4, pp. 153–199 (1944).

Pratt: Antibiotics, pp. 173–178 (1949).

JULIAN S. LEVITT, *Primary Examiner.*

SAM ROSEN, *Assistant Examiner.*